United States Patent
Li et al.

(10) Patent No.: US 11,179,685 B2
(45) Date of Patent: Nov. 23, 2021

(54) SYSTEM AND METHOD FOR MIXING STONE-PLASTIC FLOOR BASE MATERIAL

(71) Applicant: Central South University of Forestry and Technology, Changsha (CN)

(72) Inventors: Xingong Li, Hunan (CN); Yixu Yang, Hunan (CN); Yiqiang Wu, Hunan (CN); Xia Zheng, Hunan (CN); Yan Qing, Hunan (CN); Yingfeng Zuo, Hunan (CN); Ming Liu, Hunan (CN)

(73) Assignee: Central South University of Forestry and Technology, Changsha (CN)

( * ) Notice: Subject to any disclaimer, the term of this patent is extended or adjusted under 35 U.S.C. 154(b) by 307 days.

(21) Appl. No.: 16/593,440

(22) Filed: Oct. 4, 2019

(65) Prior Publication Data
US 2021/0046436 A1 Feb. 18, 2021

(30) Foreign Application Priority Data

Aug. 15, 2019 (CN) .......................... 201910752586.X

(51) Int. Cl.
  *B01F 5/06* (2006.01)
  *B01D 45/16* (2006.01)
  (Continued)

(52) U.S. Cl.
  CPC ............ *B01F 5/0609* (2013.01); *B01D 45/16* (2013.01); *B01D 46/02* (2013.01); *B01F 3/18* (2013.01);
  (Continued)

(58) Field of Classification Search
CPC .. B29B 7/02; B29B 7/22; B29B 7/826; B01D 45/16; B01D 46/02; E04F 15/105;
(Continued)

(56) References Cited

U.S. PATENT DOCUMENTS

| | | | | |
|---|---|---|---|---|
| 3,951,714 A | * | 4/1976 | Franco ................... | B44C 3/025 156/62.2 |
| 4,225,374 A | * | 9/1980 | Kaufmann ............. | B32B 37/26 156/220 |

(Continued)

FOREIGN PATENT DOCUMENTS

CN 110450295 A * 11/2019 ............ B01F 5/0609

*Primary Examiner* — Tony G Soohoo
(74) *Attorney, Agent, or Firm* — Harness, Dickey & Pierce, P.L.C.

(57) ABSTRACT

A solenoid valve includes a main valve, a first auxiliary valve, a second auxiliary valve, a main valve body, and an auxiliary valve body. The main and auxiliary valve bodies are axially parallel and detachably connected. The main valve is mounted on the main valve body, the first and second auxiliary valves are mounted on the auxiliary valve body, which is provided with an air inlet, a cylinder port and an air discharging port. The air inlet communicates with the main valve through a first air passage. The cylinder port is sequentially in communication with the first and second auxiliary valves and the main valve through a second air passage. The air discharging port sequentially communicates with the first and second auxiliary valves and the main valve through a third air passage. The main and second auxiliary valves are solenoid valves. The first auxiliary valve is a hand-operated valve.

20 Claims, 1 Drawing Sheet

(51) Int. Cl.
  *B01D 46/02* (2006.01)
  *B01F 15/06* (2006.01)
  *E04F 15/12* (2006.01)
  *B01F 3/18* (2006.01)
  *B29B 7/82* (2006.01)
  *B01F 15/00* (2006.01)
  *E04F 15/10* (2006.01)

(52) U.S. Cl.
  CPC ...... *B01F 15/00974* (2013.01); *B01F 15/063* (2013.01); *B01F 15/065* (2013.01); *B29B 7/826* (2013.01); *E04F 15/105* (2013.01); *E04F 15/12* (2013.01); *B01F 2015/061* (2013.01); *B01F 2015/062* (2013.01)

(58) Field of Classification Search
  CPC .. E04F 15/12; B01F 5/0609; B01F 15/00974; B01F 15/063; B01F 15/065; B01F 2015/061; B01F 2015/062; B01F 3/18
  USPC ............................................. 366/165.1, 165.2
  See application file for complete search history.

(56) References Cited

U.S. PATENT DOCUMENTS

| | | | | |
|---|---|---|---|---|
| 5,178,912 | A * | 1/1993 | Piacente | B05D 1/28 118/244 |
| 5,411,811 | A * | 5/1995 | Piacente | B05D 1/28 428/143 |
| 5,670,237 | A * | 9/1997 | Shultz | D06N 3/0077 428/173 |
| 6,869,985 | B2 * | 3/2005 | Mohanty | B29C 67/24 523/124 |
| 10,059,072 | B2 * | 8/2018 | Hannig | B44C 5/0461 |
| 10,479,134 | B2 * | 11/2019 | Hannig | B27N 3/24 |
| 10,618,346 | B2 * | 4/2020 | Hannig | B30B 5/06 |
| 2016/0289397 | A1 * | 10/2016 | Tinkl | B29C 48/022 |
| 2018/0333942 | A1 * | 11/2018 | Seo | B32B 37/144 |
| 2019/0368121 | A1 * | 12/2019 | Oishi | D21H 17/70 |
| 2020/0108524 | A1 * | 4/2020 | Schrul | D06N 3/0077 428/173 |
| 2020/0130377 | A1 * | 4/2020 | Iio | B41J 2/135 |
| 2020/0399437 | A1 * | 12/2020 | Pawelski | B32B 37/26 156/220 |
| 2021/0046436 | A1 * | 2/2021 | Li | B44C 3/025 156/62.2 |

* cited by examiner

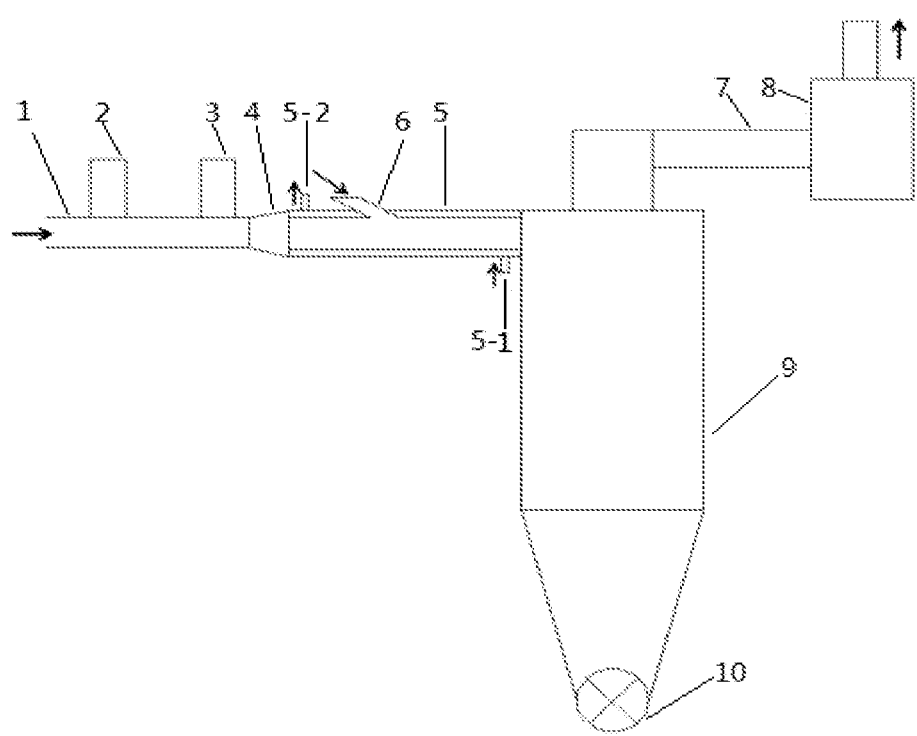

SYSTEM AND METHOD FOR MIXING STONE-PLASTIC FLOOR BASE MATERIAL

CROSS-REFERENCE TO RELATED APPLICATIONS

This application claims priority to Chinese application number 201910752586X, filed Aug. 15, 2019, with a title of SYSTEM AND METHOD FOR MIXING STONE-PLASTIC FLOOR BASE MATERIAL. The above-mentioned patent application is incorporated herein by reference in its entirety.

FIELD

The present disclosure relates to the technical field of decoration material manufacturing, in particular, to a system and method for mixing stone-plastic floor base materials.

BACKGROUND

Stone-plastic floor is a floor made of polyvinyl chloride (PVC) and natural calcium carbonate as main raw materials through a certain forming process. The raw material polyethylene is an environmentally friendly, non-toxic renewable resource, and has been widely used in people's daily life, such as tableware and medical infusion pipes and bags. All ingredients added in the production process of the stone-plastic floor are non-toxic and non-radioactive, do not include any heavy metals, but have trustworthy environmental friendliness. At the same time, the surface of the stone-plastic floor is usually covered with a transparent wear-resistant layer, which has up to 200,000 rpm of wear-resistant revolutions. The stone-plastic floor has the advantages of environmental friendliness, high strength, fire resistance, moisture resistance, wear resistance, corrosion resistance and low coefficient of thermal expansion, and can be widely used in homes and in shopping malls, supermarkets, airports, laboratories and hospitals with large people, etc.

A stone-plastic floor base material is prepared by mixing PVC, natural calcium carbonate and an additive according to a certain ratio through a mixing machine and the like, then extruding, and die-forming. An ordinary mixing method has low efficiency and poor uniformity, which greatly affects the mechanical strength and production efficiency of the stone-plastic floor base materials. Therefore, it is significant to develop a new system for mixing stone-plastic floor base materials.

SUMMARY

In view of this, an objective of the present disclosure is to provide a system and method for mixing stone-plastic floor base materials. The system for mixing stone-plastic floor base materials provided by the present disclosure has high mixing efficiency and good uniformity.

To achieve the above purpose, the present disclosure provides the following technical solutions.

The present disclosure provides a system for mixing stone-plastic floor base materials, including a hot air pipe 1, a transition pipe 4, a mixing pipe 5 and a cyclone separator 9, which are sequentially connected, where the hot air pipe 1 is provided with a calcium carbonate feed port 2 and a polyvinyl chloride PVC feed port 3; a distance between the calcium carbonate feed port 2 and the PVC feed port 3 is 1,000-2,000 mm; the PVC feed port 3 is adjacent to the transition pipe 4;

the mixing pipe 5 is provided with a cold air pipe 6; the mixing pipe 5 is a double-layered sleeve structure, and an outer layer of the double-layered sleeve structure is provided with a water inlet 5-1 and a water outlet 5-2;

a bottom end of the cyclone separator 9 is provided with a locking device 10, and a top end is sequentially connected to an induced air pipe 7 and an induced draft fan 8.

Preferably, the inner diameter of the hot air pipe 1 is 100-500 mm; the length of the connecting pipe 4 is 300-500 mm; the inner diameter of the mixing pipe 5 is 200-700 mm, and the length thereof is 3,000-4,000 mm; the inner diameter of the mixing pipe 5 is larger than the inner diameter of the hot air pipe 1.

Preferably, inner walls of the hot air pipe 1, the connecting pipe 4 and the mixing pipe 5 are coated with a Teflon layer.

Preferably, the cold air pipe 6 is open to the atmosphere, and has an adjustable damper.

Preferably, an angle between the cold air pipe 6 and the mixing pipe 5 is less than 30°, and the inner diameter of the cold air pipe 6 is 100-300 mm.

Preferably, the inner diameter of the induced air pipe 7 is 300-800 mm; an air outlet pipe of the induced draft fan 8 is connected to a bag filter; the inner diameter of a cylindrical part of the cyclone separator 9 is 1,200-2,000 mm.

The present disclosure provides a method for mixing stone-plastic floor base materials, including the following steps:

(a) adding calcium carbonate powder and PVC powder from a calcium carbonate feed port 2 and a PVC feed port 3, respectively, where the calcium carbonate powder is heated by hot air introduced to a hot air pipe 1 and then mixed with the PVC powder to obtain a mixture;

(b) allowing the mixture to enter into a mixing pipe 5 under the action of airflow, where the mixture is cooled by cold air entering from a cold air pipe 6 and cooling water flowing from a water inlet 5-1; and (c) sending the cooled mixture with airflow to a cyclone separator 9 for gas-solid separation, where the airflow is sent to an induced draft fan 8 through an induced air pipe 7, and the cooled mixture is discharged to a silo through a locking device 10 to obtain a mixture of the stone-plastic floor base materials.

Preferably, the driving power of the induced draft fan 8 is 5.5-10.0 kW, and the driving power of the locking device 10 is 1.1-2.2 kW.

Preferably, the calcium carbonate powder has a particle size of 400-600 meshes, and the PVC powder has a particle size of 200-300 meshes; the calcium carbonate powder and the PVC powder have a mass ratio of 10-30:90-70.

Preferably, the temperature of the hot air is 170-190° C.; the flow rate of the cooling water is 1-2 t/h; the temperature of the cooled mixture is less than 70° C.

The present disclosure provides a system for mixing stone-plastic floor base materials, including a hot air pipe 1, a transition pipe 4, a mixing pipe 5, a cold air pipe 6, an induced air pipe 7, an induced draft fan 8, a cyclone separator 9 and a locking device 10. The present disclosure disposes a calcium carbonate feed port 2 and a polyvinyl chloride (PVC) feed port 3 with a separation distance of 1,000-2,000 mm on the hot air pipe 1; calcium carbonate powder is first heated by hot air and then mixed with PVC powder; as the calcium carbonate powder has been heated, the PVC powder adheres to the surface of the calcium carbonate powder, and thus the calcium carbonate powder and the PVC powder are uniformly mixed. Compared with an ordinary mixing method, mixing the stone-plastic floor base materials by the system provided by the present disclosure improves the mixing efficiency by more than 50%, remarkably improves the mixing uniformity, realizes a more reasonable structure of the stone-plastic base materials, and significantly improves the mechanical strength.

BRIEF DESCRIPTION OF THE DRAWINGS

FIG. 1 is a schematic structural diagram of a system for mixing stone-plastic floor base materials provided by the present disclosure, where 1. hot air pipe, 2. calcium carbonate feed port, 3. polyvinyl chloride (PVC) feed port, 4. transition pipe, 5. mixing pipe, 5-1 water inlet, 5-2 water outlet, 6. cold air pipe, 7. induced air pipe, 8. induced draft fan, 9. cyclone separator, and 10. locking device.

DETAILED DESCRIPTION

The present disclosure provides a system for mixing stone-plastic floor base materials, as shown in FIG. 1, including a hot air pipe 1, a transition pipe 4, a mixing pipe 5 and a cyclone separator 9, which are sequentially connected (the arrow in FIG. 1 indicates the flow direction of airflow or cooling water).

The system for mixing stone-plastic floor base materials provided by the present disclosure includes a hot air pipe 1. In the present disclosure, the inner diameter of the hot air pipe 1 may be 100-500 mm, more specifically 200-300 mm. In the present disclosure, the hot air pipe 1 is connected to a hot air source; the hot air pipe may be a steel pipe, and the present disclosure has no special requirement on the steel pipe, and a steel pipe well known in the art can be used. In the present disclosure, the hot air pipe 1 is provided with a calcium carbonate feed port 2 and a PVC feed port 3; a distance between the calcium carbonate feed port 2 and the PVC feed port 3 (that is, a distance between centers of the calcium carbonate feed port 2 and the PVC feed port 3) is 1,000-2,000 mm, preferably 1,300-1,800 mm, more preferably 1,500 mm; the PVC feed port 3 is adjacent to the transition pipe 4. The present disclosure defines that the distance between the calcium carbonate feed port 2 and the PVC feed port 3 is 1,000-2,000 mm, which can ensure that calcium carbonate powder entering from the calcium carbonate feed port 2 is fully heated by the hot air pipe 1 and then mixed with PVC entering from the PVC feed port 3.

The system for mixing stone-plastic floor base materials provided by the present disclosure includes a transition pipe 4. In the present disclosure, the length of the transition pipe 4 may be 300-500 mm, specifically 400 mm; the transition pipe 4 may be a steel pipe, and the present disclosure has no special requirement on the steel pipe, and a steel pipe well known in the art can be used. One end of the transition pipe 4 is connected to the hot air pipe 1, and the other end is connected to the mixing pipe 5; the transition pipe 4 serves as a connecting pipe of the hot air pipe 1 and the mixing pipe 5.

The system for mixing stone-plastic floor base materials provided by the present disclosure includes a mixing pipe 5. The mixing pipe 5 is a double-layered sleeve structure, and the double-layered sleeve structure is specifically a structure composed of an inner layer pipe and an outer layer pipe that are coaxial; the inner layer pipe and the outer layer pipe may be made of a common steel material; a distance between the inner layer pipe and the outer layer pipe (i.e. between the layers of the mixing pipe 5) may be 5-10 mm. The inner diameter of the mixing pipe 5 (i.e. the inner diameter of the inner layer pipe) may be 200-700 mm, more specifically 400-500 mm, and the length thereof may be 3,000-4,000 mm, more specifically 3,500-4,000 mm; the inner diameter of the mixing pipe 5 may be larger than the inner diameter of the hot air pipe 1. The mixing pipe 5 is provided with a cold air pipe 6; the cold air pipe 6 communicates with the inner layer pipe. The cold air pipe 6 may be open to the atmosphere, that is, the atmosphere is used as a cold air source; the cold air pipe 6 may be an adjustable damper, and the amount of cold air entering from the cold air pipe 6 can be adjusted by adjusting the size of the damper. An angle between the cold air pipe 6 and the mixing pipe 5 may be less than 30°, which can reduce the resistance of the cold air; the inner diameter of the cold air pipe 6 may be 100-300 mm, more specifically 200 mm. The outer layer of the mixing pipe 5 (double-layered sleeve structure) is provided with a water inlet 5-1 and a water outlet 5-2; the water inlet 5-1 is disposed at a lower right end of the mixing pipe 5 (one end close to the cyclone separator 9), and the water outlet 5-2 is disposed at an upper left end of the mixing pipe 5 (one end close to the transition pipe 4). A horizontal distance between the water inlet 5-1 and the water outlet 5-2 may be 2,900-3,900 mm, more specifically 2,850-3,850 mm. Tap water is preferably used as cooling water, that is, the tap water flows from the water inlet 5-1 and is released into a recovery tank from the water outlet 5-2. A mixture in the mixing pipe 5 is rapidly cooled by the action of the cold air entering from the cold air pipe 6 and the cooling water passing through the layers of the mixing pipe 5. Inner walls of the hot air pipe 1, the connecting pipe 4 and the mixing pipe 5 are preferably coated with a Teflon layer to prevent a material from adhering to the inner walls of the pipes.

The system for mixing stone-plastic floor base materials provided by the present disclosure includes a cyclone separator 9. A bottom end of the cyclone separator 9 is provided with a locking device 10, and a top end is sequentially connected to the induced air pipe 7 and the induced draft fan 8. The inner diameter of the induced air pipe 7 may be 300-800 mm, more specifically 400-600 mm; and an air outlet pipe of the induced draft fan 8 is preferably connected to a bag filter. The inner diameter of a cylindrical part of the cyclone separator 9 may be 1,200-2,000 mm, more specifically 1,500-1,600 mm. The cyclone separator is used for gas-solid separation of a material; separated airflow is sent to the induced draft fan 8 through the induced air pipe 7, and is discharged after being dusted by the bag filter, while a separated solid material is discharged to a silo through the locking device 10.

The present disclosure provides a method for mixing stone-plastic floor base materials by using the system described in the above solution, including the following steps:

(a) adding calcium carbonate powder and PVC powder from a calcium carbonate feed port 2 and a PVC feed port 3, respectively, where the calcium carbonate powder is heated by hot air introduced to a hot air pipe 1, and then mixed with the PVC powder to obtain a mixture;

(b) allowing the mixture to enter into a mixing pipe 5 under the action of airflow, where the mixture is cooled by cold air entering from a cold air pipe 6 and cooling water flowing from a water inlet 5-1; and (c) sending the cooled mixture with airflow to a cyclone separator 9 for gas-solid separation, where the airflow is sent to an induced draft fan 8 through an induced air pipe 7, and the cooled mixture is discharged to a silo through a locking device 10 to obtain a mixture of the stone-plastic floor base materials.

The present disclosure adds the calcium carbonate powder and the PVC powder from the calcium carbonate feed port 2 and the PVC feed port 3, respectively, where the calcium carbonate powder is heated by the hot air introduced to the hot air pipe 1 and then mixed with the PVC powder to obtain a mixture. Before adding the calcium carbonate powder and the PVC powder, the present disclosure preferably sequentially activates driving motors of the induced draft fan 8 and the locking device 10 to introduce the hot air into the hot air pipe 1 while introducing cold air into the cold air pipe 6; the driving power of the induced draft fan 8 is preferably 5.5-10.0 kW; the driving power of the locking device 10 is preferably 1.1-2.2 kW; the velocity of the hot air is preferably 12-16 m/s, and the velocity of the cold air is preferably 10-12 m/s. The calcium carbonate powder preferably has a particle size of 400-600 meshes, more specifically 500 meshes; the PVC powder preferably has a particle size of 200-300 meshes, more specifically 250 meshes; the calcium carbonate powder and the PVC powder have a mass ratio of preferably 10-30:90-70, more specifically 20:80. The present disclosure has no special requirement on the source of the calcium carbonate powder and the PVC powder, and a product with a source well known in the art can be used. The calcium carbonate powder and the PVC powder are preferably transported by a screw conveyor, that is, a motor of the screw conveyor is started, and the calcium carbonate powder and the PVC powder are respectively sent to the calcium carbonate feed port 2 and the PVC powder feed port 3. In the present disclosure, the temperature of the hot air is preferably 170-190° C., more preferably 180° C. After the calcium carbonate powder and the PVC powder are added, the calcium carbonate powder is first heated by the hot air and then mixed with the PVC powder. As the calcium carbonate powder has been heated, the PVC powder adheres to the surface of the calcium carbonate powder, and thus calcium carbonate powder and the PVC powder are uniformly mixed.

After the mixture is obtained, the present disclosure allows the mixture to enter the mixing pipe 5 under the action of the airflow, and the mixture is cooled by the cold air entering from the cold air pipe 6 and the cooling water flowing from the water inlet 5-1. The flow rate of the cooling water is preferably 1-2 t/h; and the temperature of the cooled mixture is preferably less than 70° C. In the present disclosure, the mixture is granulated after being cooled.

After cooling, the present disclosure allows the cooled mixture to enter with airflow into the cyclone separator 9 for gas-solid separation, and the airflow is sent to the induced draft fan 8 through the induced air pipe 7, while the cooled mixture is discharged to the silo through the locking device 10. After the mixture is discharged from the silo, the present disclosure preferably continues to cool the mixture; the present disclosure has no special requirement on the method of the cooling, and a method well known in the art can be used, specifically, the mixture is naturally cooled to room temperature, thereby obtaining the mixture of the stone-plastic floor base materials.

After the mixture of the stone-plastic floor base materials is obtained, the present disclosure preferably sequentially shuts down the motors of the screw conveyors feeding the calcium carbonate powder and the PVC powder, and then sequentially shuts down the driving motors of the induced draft fan 8 and the locking device 10 to end the system operation.

The following describes the system and method for mixing stone-plastic floor base materials provided by the present disclosure in detail with reference to examples and embodiments, but the examples and embodiments may not be construed as a limitation to the protection scope of the present disclosure.

Embodiment 1

The present embodiment provides a system for mixing stone-plastic floor base materials, as shown in FIG. 1.

(1) Driving motors of an induced draft fan 8 and a locking device 10 are sequentially activated to introduce hot air of 170° C. into the system from a hot air pipe 1 while introducing cold air from the atmosphere into the system from a cold air pipe 6; the driving motor of the induced draft fan 10 has power of 5.5 kW, and the drive motor of the locking device 8 has power of 1.1 kW.

(2) Motors of screw conveyors that transport natural calcium carbonate powder and PVC powder are sequentially activated to add 400 meshes of natural calcium carbonate powder and 200 meshes of PVC powder respectively from a calcium carbonate feed port 2 and a PVC powder feed port 3; a distance between the calcium carbonate feed port 2 and the PVC powder feed port 3 is 1,800 mm; the natural calcium carbonate powder is first heated by the hot air and then mixed with the PVC powder; as the natural calcium carbonate powder has been heated, the PVC powder adheres to the surface of the natural calcium carbonate powder, and thus the natural calcium carbonate powder and the PVC powder are uniformly mixed in the hot air pipe 1 having a diameter of 250 mm; the natural calcium carbonate powder and the PVC powder have a mass ratio of 15:85.

(3) The uniformly mixed natural calcium carbonate powder and PVC powder enter a mixing pipe 5 having a diameter of 400 mm and a length of 3,000 mm under the action of airflow; in the mixing pipe 5, the uniformly mixed natural calcium carbonate powder and PVC powder are rapidly cooled to below 70° C. by the combined action of the cold air introduced from the cold air pipe 6 having a diameter of 150 mm and cooling water passing through a wall of the mixing pipe 5; the flow rate of tap water is 1 t/h.

(4) The cooled mixture of the natural calcium carbonate powder and the PVC powder are granulated, and together with airflow, enter a cyclone separator 9 having a cylindrical diameter of 1,400 mm; the cyclone separator 9 separates the granular mixture of the natural calcium carbonate powder and the PVC powder from the airflow, and the airflow is sent to the induced draft fan 8 through an induced air pipe 7 having a diameter of 400 mm in an upper part of the cyclone separator 9; an air outlet pipe of the induced draft fan 8 is connected to a bag filter; the granular mixture of the natural calcium carbonate powder and the PVC powder are discharged through the locking device 10 at a lower part of the cyclone separator 9 to a silo for further cooling.

(5) After the mixing is completed, the motors of the screw conveyors feeding the natural calcium carbonate powder and the PVC powder are sequentially shut down, and then the driving motors of the induced draft fan 8 and the locking device 10 are sequentially shut down.

COMPARATIVE EXAMPLE 1

Comparison with an ordinary mixing method: 400 meshes of natural calcium carbonate powder and 200 meshes of PVC powder (the natural calcium carbonate powder and the PVC powder have a mass ratio of 15:85) are mechanically stirred and mixed by a high-speed mixer at 125° C.

Comparison of Mixing Effects:

(1) The uniformity of the mixing directly affects the mechanical strength of a stone-plastic floor base material; the mixture of stone-plastic floor base materials obtained by Embodiment 1 and Comparative Example 1 are made into stone-plastic floor base materials according to the same method; mechanical properties of the stone-plastic floor base materials are tested separately, and the results are shown in Table 1:

TABLE 1

Mechanical properties of stone-plastic floor base materials of Embodiment 1 and Comparative Example 1

| Test items | Stone-plastic floor base materials of Embodiment 1 | Stone-plastic floor base materials of Comparative Example 1 |
|---|---|---|
| Bending strength/MPa | 98.5 | 116 |
| Impact strength kJ/m$^2$ | 4.0 | 5.5 |

It can be seen from Table 1 that, compared with the ordinary mixing method, mixing the stone-plastic floor base materials by the system provided by the present disclosure significantly improves the mechanical properties of the stone-plastic floor base materials, indicating that the system provided by the present disclosure has good mixing uniformity.

(2) Comparison of mixing efficiency: Taking a 2 million m$^2$/year stone-plastic floor production line as an example, the line has an output of 0.9 t/h by using the mixing method of Comparative Example 1, and an output of 2.00 t/h or more by using the mixing method of Embodiment 1. It can be seen that, compared with the ordinary mixing method, mixing the stone-plastic floor base materials by the system provided by the present disclosure improves the mixing efficiency by more than 50%.

Embodiment 2

The present embodiment provides a system for mixing stone-plastic floor base materials, as shown in FIG. 1.

(1) Driving motors of an induced draft fan 8 and a locking device 10 are sequentially activated to introduce hot air of 180° C. into the system from a hot air pipe 1 while introducing cold air from the atmosphere into the system from a cold air pipe 6; the driving motor of the induced draft fan 10 has power of 7.5 kW, and the drive motor of the locking device 8 has power of 1.5 kW.

(2) Motors of screw conveyors that transport natural calcium carbonate powder and PVC powder are sequentially activated to add 500 meshes of natural calcium carbonate powder and 250 meshes of PVC powder respectively from a calcium carbonate feed port 2 and a PVC powder feed port 3; a distance between the calcium carbonate feed port 2 and the PVC powder feed port 3 is 1,500 mm; the natural calcium carbonate powder is first heated by the hot air and then mixed with the PVC powder; as the natural calcium carbonate powder has been heated, the PVC powder adheres to the surface of the natural calcium carbonate powder, and thus the natural calcium carbonate powder and the PVC powder are uniformly mixed in the hot air pipe 1 having a diameter of 300 mm; the natural calcium carbonate powder and the PVC powder have a mass ratio of 20:80.

(3) The uniformly mixed natural calcium carbonate powder and PVC powder enter a mixing pipe 5 having a diameter of 500 mm and a length of 3,500 mm under the action of airflow; in the mixing pipe 5, the uniformly mixed natural calcium carbonate powder and PVC powder are rapidly cooled to below 70° C. by the combined action of the cold air introduced from the cold air pipe 6 having a diameter of 200 mm and cooling water passing through a wall of the mixing pipe 5; the flow rate of tap water is 1.5 t/h.

(4) The cooled mixture of the natural calcium carbonate powder and the PVC powder are granulated, and together with airflow, enter a cyclone separator 9 having a cylindrical diameter of 1,600 mm; the cyclone separator 9 separates the granular mixture of the natural calcium carbonate powder and the PVC powder from the airflow, and the airflow is sent to the induced draft fan 8 through an induced air pipe 7 having a diameter of 500 mm in an upper part of the cyclone separator 9; an air outlet pipe of the induced draft fan 8 is connected to a bag filter; the granular mixture of the natural calcium carbonate powder and the PVC powder are discharged through the locking device 10 at a lower part of the cyclone separator 9 to a silo for further cooling.

(5) After the mixing is completed, the motors of the screw conveyors feeding the natural calcium carbonate powder and the PVC powder are sequentially shut down, and then the driving motors of the induced draft fan 8 and the locking device 10 are sequentially shut down.

COMPARATIVE EXAMPLE 2

Comparison with an ordinary mixing method: 500 meshes of natural calcium carbonate powder and 250 meshes of PVC powder (the natural calcium carbonate powder and the PVC powder have a mass ratio of 20:80) are mechanically stirred and mixed by a high-speed mixer at 125° C.

Comparison of Mixing Effects:

(1) The mixture of stone-plastic floor base materials obtained by Embodiment 2 and Comparative Example 2 are made into stone-plastic floor base materials according to the same method; mechanical properties of the stone-plastic floor base materials are tested separately, and the results are shown in Table 2:

TABLE 2

Mechanical properties of stone-plastic floor base materials of Embodiment 2 and Comparative Example 2

| Test items | Stone-plastic floor base materials of Embodiment 2 | Stone-plastic floor base materials of Comparative Example 2 |
|---|---|---|
| Bending strength/MPa | 93.3 | 104.3 |
| Impact strength kJ/m$^2$ | 4.2 | 6.0 |

It can be seen from Table 2 that, compared with the ordinary mixing method, mixing the stone-plastic floor base materials by the system provided by the present disclosure significantly improves the mechanical properties of the stone-plastic base materials, indicating that the system provided by the present disclosure has good mixing uniformity.

(2) Comparison of mixing efficiency: Taking a 2 million m$^2$/year stone-plastic floor production line as an example, the line has an output of 0.9 t/h by using the mixing method of Comparative Example 1, and an output of 2.10 t/h or more by using the mixing method of Embodiment 1. Compared with the ordinary mixing method of Comparative Embodiment 2, mixing the stone-plastic floor base materials by the method provided by Embodiment 2 improves the mixing efficiency by more than 50%.

Embodiment 3

(1) Driving motors of an induced draft fan 8 and a locking device 10 are sequentially activated to introduce hot air of 190° C. into the system from a hot air pipe 1 while introducing cold air from the atmosphere into the system from a cold air pipe 6; the driving motor of the induced draft fan 10 has power of 10 kW, and the drive motor of the locking device 8 has power of 2.2 kW.

(2) Motors of screw conveyors that transport natural calcium carbonate powder and PVC powder are sequentially activated to add 500 meshes of natural calcium carbonate powder and 250 meshes of PVC powder respectively from a calcium carbonate feed port 2 and a PVC powder feed port 3; a distance between the calcium carbonate feed port 2 and the PVC powder feed port 3 is 1,700 mm; the natural calcium carbonate powder is first heated by the hot air and then mixed with the PVC powder; as the natural calcium carbonate powder has been heated, the PVC powder adheres to the surface of the natural calcium carbonate powder, and thus the natural calcium carbonate powder and the PVC powder are uniformly mixed in the hot air pipe 1 having a diameter of 300 mm; the natural calcium carbonate powder and the PVC powder have a mass ratio of 25:75.

(3) The uniformly mixed natural calcium carbonate powder and PVC powder enter a mixing pipe 5 having a diameter of 500 mm and a length of 4,000 mm under the action of airflow; in the mixing pipe 5, the uniformly mixed natural calcium carbonate powder and PVC powder are rapidly cooled to below 70° C. by the combined action of the cold air introduced from the cold air pipe 6 having a diameter of 200 mm and cooling water passing through a wall of the mixing pipe 5; the flow rate of tap water is 2.0 t/h.

(4) The cooled mixture of the natural calcium carbonate powder and the PVC powder are granulated, and together with airflow, enter a cyclone separator 9 having a cylindrical diameter of 1,600 mm; the cyclone separator 9 separates the granular mixture of the natural calcium carbonate powder and the PVC powder from the airflow, and the airflow is sent to the induced draft fan 8 through an induced air pipe 7 having a diameter of 500 mm in an upper part of the cyclone separator 9; an air outlet pipe of the induced draft fan 8 is connected to a bag filter; the granular mixture of the natural calcium carbonate powder and the PVC powder are discharged through the locking device 10 at a lower part of the cyclone separator 9 to a silo for further cooling.

(5) After the mixing is completed, the motors of the screw conveyors feeding the natural calcium carbonate powder and the PVC powder are sequentially shut down, and then the driving motors of the induced draft fan 8 and the locking device 10 are sequentially shut down.

COMPARATIVE EXAMPLE 3

Comparison with an ordinary mixing method: 500 meshes of natural calcium carbonate powder and 250 meshes of PVC powder (the natural calcium carbonate powder and the PVC powder have a mass ratio of 25:75) are mechanically stirred and mixed by a high-speed mixer at 125° C.

Comparison of Mixing Effects:

(1) The mixture of stone-plastic floor base materials obtained by Embodiment 3 and Comparative Example 3 are made into stone-plastic floor base materials according to the same method; mechanical properties of the stone-plastic floor base materials are tested separately, and the results are shown in Table 3:

TABLE 3

Mechanical properties of stone-plastic floor base materials of Embodiment 3 and Comparative Example 3

| Test items | Stone-plastic floor base materials of Embodiment 3 | Stone-plastic floor base materials of Comparative Example 3 |
| --- | --- | --- |
| Bending strength/MPa | 81.4 | 90.1 |
| Impact strength kJ/m$^2$ | 4.9 | 6.5 |

It can be seen from Table 3 that, compared with the ordinary mixing method, mixing the stone-plastic floor base materials by the system provided by the present disclosure significantly improves the mechanical properties of the stone-plastic floor base materials, indicating that the system provided by the present disclosure has good mixing uniformity.

(2) Comparison of mixing efficiency: Taking a 2 million m$^2$/year stone-plastic floor production line as an example, the line has an output of 0.9 t/h by using the mixing method of Comparative Example 1, and an output of 2.04 t/h or more by using the mixing method of Embodiment 1. Compared with the ordinary mixing method of Comparative Embodiment 3, mixing the stone-plastic floor base materials by the method provided by Embodiment 3 improves the mixing efficiency by more than 50%.

The above embodiments show that, compared with an ordinary mixing method, mixing the stone-plastic floor base materials by the system and method provided by the present disclosure improves the mixing efficiency by more than 50%, remarkably improves the mixing uniformity, realize a more reasonable structure of the stone-plastic base materials, and significantly improves the mechanical strength.

The above description merely provides examples of implementations of the present disclosure. It should be pointed out that for a person of ordinary skilled in the art, several improvements and modifications may further be made without departing from the principle of the present disclosure, and the improvements and modifications should also be considered to fall within the protection scope of the present disclosure.

What is claimed is:

1. A system for mixing stone-plastic floor base materials, comprising:
a hot air pipe (1);
a transition pipe (4);
a mixing pipe (5); and
a cyclone separator (9), which are sequentially connected, wherein
the hot air pipe (1) is provided with a calcium carbonate feed port (2) and a polyvinyl chloride (PVC) feed port (3); a distance between the calcium carbonate feed port (2) and the PVC feed port (3) is 1,000-2,000 mm; the PVC feed port (3) is adjacent to the transition pipe (4);
the mixing pipe (5) is provided with a cold air pipe (6); the mixing pipe (5) is a double-layered sleeve structure, and an outer layer of the double-layered sleeve structure is provided with a water inlet (5-1) and a water outlet (5-2);
a bottom end of the cyclone separator (9) is provided with a locking device (10), and a top end is sequentially connected to an induced air pipe (7) and an induced draft fan (8).

2. The system for mixing stone-plastic floor base materials according to claim 1, wherein the inner diameter of the hot air pipe (1) is 100-500 mm; the length of the connecting pipe (4) is 300-500 mm; the inner diameter of the mixing pipe (5) is 200-700 mm, and the length thereof is 3,000-4,000 mm; the inner diameter of the mixing pipe (5) is larger than the inner diameter of the hot air pipe (1).

3. The system for mixing stone-plastic floor base materials according to claim 2, wherein inner walls of the hot air pipe (1), the connecting pipe (4) and the mixing pipe (5) are coated with a Teflon layer.

4. A method for mixing stone-plastic floor base materials by using the system according to claim 3, comprising the following steps:
   (a) adding calcium carbonate powder and PVC powder from a calcium carbonate feed port (2) and a PVC feed port (3), respectively, wherein the calcium carbonate powder is heated by hot air introduced to a hot air pipe (1) and then mixed with the PVC powder to obtain a mixture;
   (b) allowing the mixture to enter into a mixing pipe (5) under the action of airflow, wherein the mixture is cooled by cold air entering from a cold air pipe (6) and cooling water flowing from a water inlet (5-1); and
   (c) sending the cooled mixture with airflow to a cyclone separator (9) for gas-solid separation, wherein the airflow is sent to an induced draft fan (8) through an induced air pipe (7), and the cooled mixture is discharged to a silo through a locking device (10) to obtain a mixture of the stone-plastic floor base materials.

5. A method for mixing stone-plastic floor base materials by using the system according to claim 2, comprising the following steps:
   (a) adding calcium carbonate powder and PVC powder from a calcium carbonate feed port (2) and a PVC feed port (3), respectively, wherein the calcium carbonate powder is heated by hot air introduced to a hot air pipe (1) and then mixed with the PVC powder to obtain a mixture;
   (b) allowing the mixture to enter into a mixing pipe (5) under the action of airflow, wherein the mixture is cooled by cold air entering from a cold air pipe (6) and cooling water flowing from a water inlet (5-1); and
   (c) sending the cooled mixture with airflow to a cyclone separator (9) for gas-solid separation, wherein the airflow is sent to an induced draft fan (8) through an induced air pipe (7), and the cooled mixture is discharged to a silo through a locking device (10) to obtain a mixture of the stone-plastic floor base materials.

6. The method according to claim 5, wherein the driving power of the induced draft fan (8) is 5.5-10.0 kW, and the driving power of the locking device (10) is 1.1-2.2 kW.

7. The system for mixing stone-plastic floor base materials according to claim 1, wherein inner walls of the hot air pipe (1), the connecting pipe (4) and the mixing pipe (5) are coated with a Teflon layer.

8. A method for mixing stone-plastic floor base materials by using the system according to claim 7, comprising the following steps:
   (a) adding calcium carbonate powder and PVC powder from a calcium carbonate feed port (2) and a PVC feed port (3), respectively, wherein the calcium carbonate powder is heated by hot air introduced to a hot air pipe (1) and then mixed with the PVC powder to obtain a mixture;
   (b) allowing the mixture to enter into a mixing pipe (5) under the action of airflow, wherein the mixture is cooled by cold air entering from a cold air pipe (6) and cooling water flowing from a water inlet (5-1); and
   (c) sending the cooled mixture with airflow to a cyclone separator (9) for gas-solid separation, wherein the airflow is sent to an induced draft fan (8) through an induced air pipe (7), and the cooled mixture is discharged to a silo through a locking device (10) to obtain a mixture of the stone-plastic floor base materials.

9. The system for mixing stone-plastic floor base materials according to claim 1, wherein the cold air pipe (6) is open to the atmosphere, and has an adjustable damper.

10. The system for mixing stone-plastic floor base materials according to claim 9, wherein an angle between the cold air pipe (6) and the mixing pipe (5) is less than 30°, and the inner diameter of the cold air pipe (6) is 100-300 mm.

11. A method for mixing stone-plastic floor base materials by using the system according to claim 10, comprising the following steps:
   (a) adding calcium carbonate powder and PVC powder from a calcium carbonate feed port (2) and a PVC feed port (3), respectively, wherein the calcium carbonate powder is heated by hot air introduced to a hot air pipe (1) and then mixed with the PVC powder to obtain a mixture;
   (b) allowing the mixture to enter into a mixing pipe (5) under the action of airflow, wherein the mixture is cooled by cold air entering from a cold air pipe (6) and cooling water flowing from a water inlet (5-1); and
   (c) sending the cooled mixture with airflow to a cyclone separator (9) for gas-solid separation, wherein the airflow is sent to an induced draft fan (8) through an induced air pipe (7), and the cooled mixture is discharged to a silo through a locking device (10) to obtain a mixture of the stone-plastic floor base materials.

12. A method for mixing stone-plastic floor base materials by using the system according to claim 9, comprising the following steps:
   (a) adding calcium carbonate powder and PVC powder from a calcium carbonate feed port (2) and a PVC feed port (3), respectively, wherein the calcium carbonate powder is heated by hot air introduced to a hot air pipe (1) and then mixed with the PVC powder to obtain a mixture;
   (b) allowing the mixture to enter into a mixing pipe (5) under the action of airflow, wherein the mixture is cooled by cold air entering from a cold air pipe (6) and cooling water flowing from a water inlet (5-1); and
   (c) sending the cooled mixture with airflow to a cyclone separator (9) for gas-solid separation, wherein the airflow is sent to an induced draft fan (8) through an induced air pipe (7), and the cooled mixture is discharged to a silo through a locking device (10) to obtain a mixture of the stone-plastic floor base materials.

13. The system for mixing stone-plastic floor base materials according to claim 1, wherein an angle between the cold air pipe (6) and the mixing pipe (5) is less than 30°, and the inner diameter of the cold air pipe (6) is 100-300 mm.

14. A method for mixing stone-plastic floor base materials by using the system according to claim 13, comprising the following steps:
   (a) adding calcium carbonate powder and PVC powder from a calcium carbonate feed port (2) and a PVC feed port (3), respectively, wherein the calcium carbonate powder is heated by hot air introduced to a hot air pipe (1) and then mixed with the PVC powder to obtain a mixture;
   (b) allowing the mixture to enter into a mixing pipe (5) under the action of airflow, wherein the mixture is cooled by cold air entering from a cold air pipe (6) and cooling water flowing from a water inlet (5-1); and (c) sending the cooled mixture with airflow to a cyclone separator (9) for gas-solid separation, wherein the airflow is sent to an induced draft fan (8) through an induced air pipe (7), and the cooled mixture is discharged to a silo through a locking device (10) to obtain a mixture of the stone-plastic floor base materials.

15. The system for mixing stone-plastic floor base materials according to claim 1, wherein the inner diameter of the induced air pipe (7) is 300-800 mm; an air outlet pipe of the induced draft fan (8) is connected to a bag filter; the inner diameter of a cylindrical part of the cyclone separator 9 is 1,200-2,000 mm.

16. A method for mixing stone-plastic floor base materials by using the system according to claim 15, comprising the following steps:

(a) adding calcium carbonate powder and PVC powder from a calcium carbonate feed port (2) and a PVC feed port (3), respectively, wherein the calcium carbonate powder is heated by hot air introduced to a hot air pipe (1) and then mixed with the PVC powder to obtain a mixture;

(b) allowing the mixture to enter into a mixing pipe (5) under the action of airflow, wherein the mixture is cooled by cold air entering from a cold air pipe (6) and cooling water flowing from a water inlet (5-1); and (c) sending the cooled mixture with airflow to a cyclone separator (9) for gas-solid separation, wherein the airflow is sent to an induced draft fan (8) through an induced air pipe (7), and the cooled mixture is discharged to a silo through a locking device (10) to obtain a mixture of the stone-plastic floor base materials.

17. A method for mixing stone-plastic floor base materials by using the system according to claim 1, comprising the following steps:

(a) adding calcium carbonate powder and PVC powder from a calcium carbonate feed port (2) and a PVC feed port (3), respectively, wherein the calcium carbonate powder is heated by hot air introduced to a hot air pipe (1) and then mixed with the PVC powder to obtain a mixture;

(b) allowing the mixture to enter into a mixing pipe (5) under the action of airflow, wherein the mixture is cooled by cold air entering from a cold air pipe (6) and cooling water flowing from a water inlet (5-1); and (c) sending the cooled mixture with airflow to a cyclone separator (9) for gas-solid separation, wherein the airflow is sent to an induced draft fan (8) through an induced air pipe (7), and the cooled mixture is discharged to a silo through a locking device (10) to obtain a mixture of the stone-plastic floor base materials.

18. The method according to claim 17, wherein the driving power of the induced draft fan (8) is 5.5-10.0 kW, and the driving power of the locking device (10) is 1.1-2.2 kW.

19. The method according to claim 17, wherein the calcium carbonate powder has a particle size of 400-600 meshes, and the PVC powder has a particle size of 200-300 meshes; the calcium carbonate powder and the PVC powder have a mass ratio of 10-30:90-70.

20. The method according to claim 17, wherein the temperature of the hot air is 170-190° C.; the flow rate of the cooling water is 1-2 t/h; the temperature of the cooled mixture is less than 70° C.

\* \* \* \* \*